(12) United States Patent
Vittu et al.

(10) Patent No.: US 12,581,206 B1
(45) Date of Patent: Mar. 17, 2026

(54) SINGLE FLEX CIRCUIT SHARED BY MULTIPLE CAMERAS OF A MULTI-CAMERA SYSTEM

(71) Applicant: Apple Inc., Cupertino, CA (US)

(72) Inventors: Julien C Vittu, Saratoga, CA (US); Howell John Chua Toc, Singapore (SG); Justin C Brunnett, Danville, CA (US); Mark R Pearce, Angus (GB); Sai Harsha Jandhyala, Carlsbad, CA (US); Himesh Patel, Fremont, CA (US); Raviprakash R Salinamakki, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 17/934,164

(22) Filed: Sep. 21, 2022

Related U.S. Application Data

(60) Provisional application No. 63/247,723, filed on Sep. 23, 2021.

(51) Int. Cl.
H04N 23/90 (2023.01)
H04N 23/57 (2023.01)

(52) U.S. Cl.
CPC ............. H04N 23/90 (2023.01); H04N 23/57 (2023.01)

(58) Field of Classification Search
CPC ........ H04N 23/90; H04N 23/57; H04N 23/54; H04N 23/51; H04N 23/55; H04N 23/687; H04N 23/00; H04N 23/52; H04N 23/50; H04N 23/45

USPC .......................................................... 348/47
See application file for complete search history.

(56) References Cited

U.S. PATENT DOCUMENTS

| | | | |
|---|---|---|---|
| 10,523,854 B2 | 12/2019 | Narayanswamy | |
| 11,252,308 B2 | 2/2022 | Jun et al. | |
| 2006/0139475 A1 | 6/2006 | Esch | |
| 2018/0167540 A1* | 6/2018 | Liu ..................... | H04M 1/0277 |
| 2020/0236254 A1* | 7/2020 | Chang ................... | H04N 23/54 |

FOREIGN PATENT DOCUMENTS

CN          117082327 A     11/2023

* cited by examiner

*Primary Examiner* — Masum Billah
(74) *Attorney, Agent, or Firm* — Robert C. Kowert; Kowert, Hood, Munyon, Rankin & Goetzel, P.C.

(57) ABSTRACT

Various embodiments include a multi-camera system having a flex circuit that is shared by a first camera and a second camera. The second camera may be actively aligned with the first camera using an active alignment process. The flex circuit includes a first portion coupled with the first camera and a second portion coupled with the second camera, where the second portion comprises a service loop proximate the second camera. The flex circuit further includes a third portion, comprising a connector for connecting the flex circuit to one or more other components. The flex circuit is configured to convey electrical signals between the connector and each of the first camera and the second camera.

20 Claims, 9 Drawing Sheets

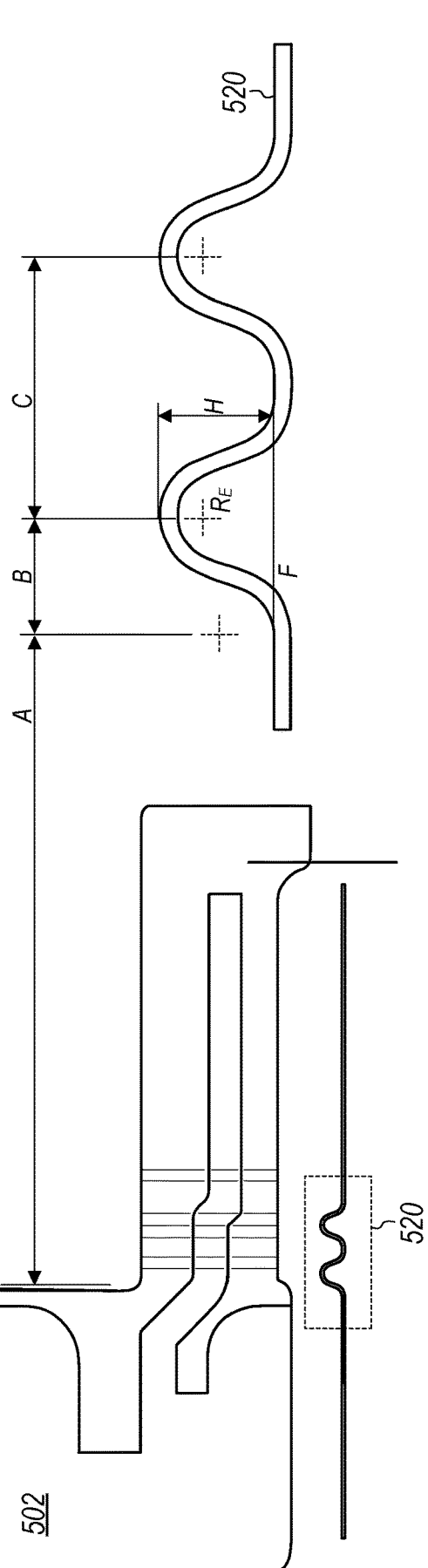
*FIG. 5*

*600*

*700*

*800*

*900*

*1000*

Couple a single flex circuit with a first camera and a second camera of a multi-camera system.
<u>1010</u>

Attach a first portion of the single flex circuit to the first camera.
<u>1020</u>

Attach a second portion of the single flex circuit to the second camera. The second portion comprises service loop proximate the second camera. A third portion of the single flex circuit comprises a connector for connecting the single flex circuit to other component(s). The single flex circuit is configured to convey electrical signals between the connector and each of the first camera and the second camera.
<u>1030</u>

SINGLE FLEX CIRCUIT SHARED BY MULTIPLE CAMERAS OF A MULTI-CAMERA SYSTEM

This application claims benefit of priority to U.S. Provisional Application Ser. No. 63/247,723, entitled "Single Flex Circuit Shared by Multiple Cameras of a Multi-Camera System," filed Sep. 23, 2021, and which is hereby incorporated herein by reference in its entirety.

BACKGROUND

Technical Field

This disclosure relates generally to a flex circuit arrangement in a multi-camera system.

Description of the Related Art

The advent of small, mobile multipurpose devices such as smartphones and tablet or pad devices has resulted in a need for high-resolution, small form factor cameras for integration in the devices. Some devices may include a multi-camera system that includes cameras held in place by a bracket. In some multi-camera systems, multiple flex circuits (e.g., a respective flex circuit for each camera) are attached to one another for purposes of conveying electrical signals along desired routes.

Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 5 illustrates a schematic cross-sectional side view of an example flex circuit with a service loop having a particular bend design, in accordance with some embodiments.

FIG. 10 is a flowchart of an example method of constructing a multi-camera system that comprises coupling a single flex circuit with a first camera and a second camera of the multi-camera system, in accordance with some embodiments.

Figures 1A, 1B:
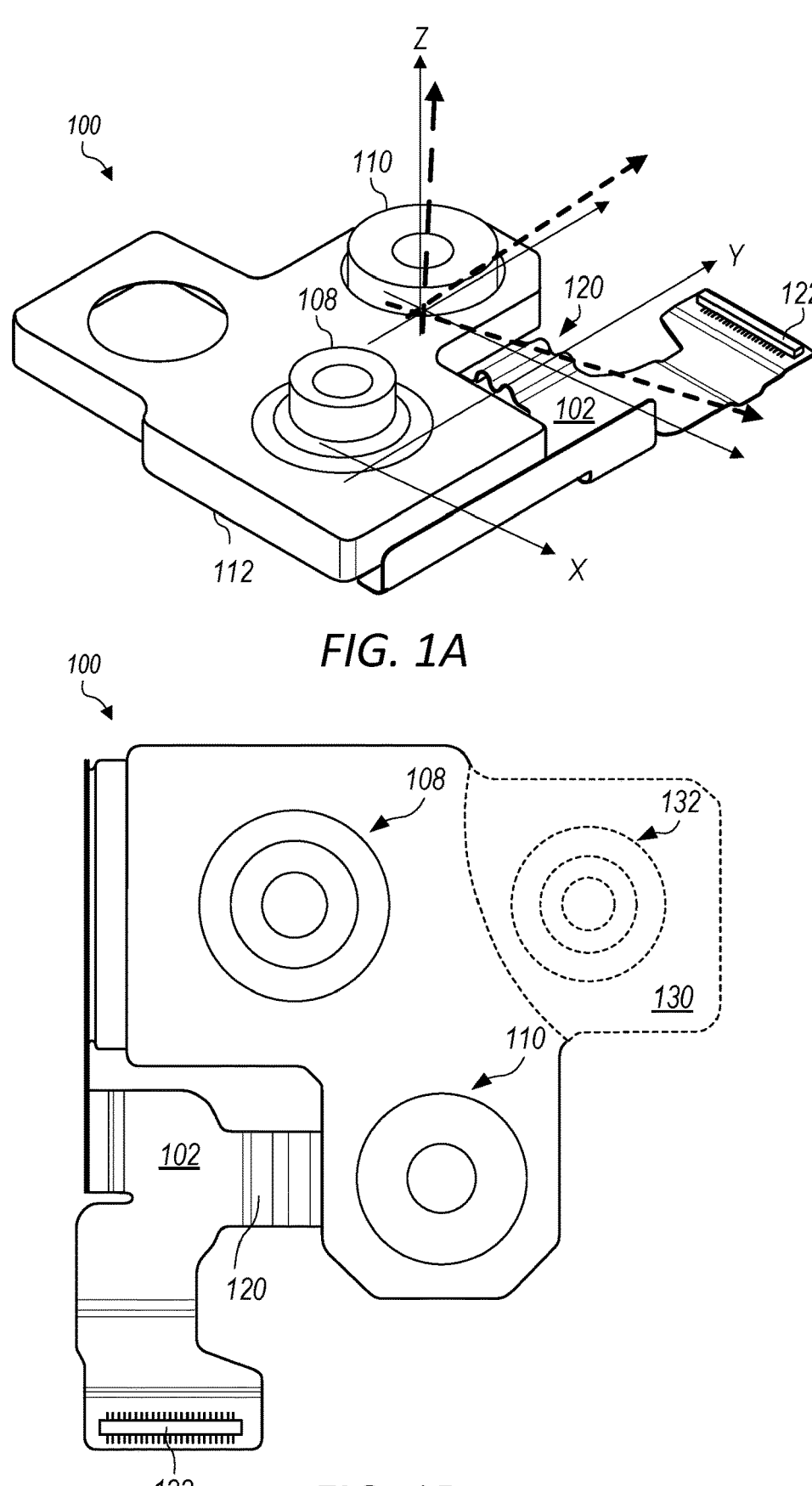
FIG. 1A illustrates a schematic perspective view of an example multi-camera system that may include a single flex circuit utilized by multiple cameras, in accordance with some embodiments.
FIG. 1B illustrates a schematic top view of the example multi-camera system depicted in FIG. 1A, in accordance with some embodiments.

This specification includes references to "one embodiment" or "an embodiment." The appearances of the phrases "In one embodiment" or "In an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a camera system having multiple cameras (referred to herein as a "multi-camera system") that are coupled to a same, shared flex circuit (referred to herein as a "single" flex circuit). It should be understood that while the term "single" is used herein to describe the aspect of multiple cameras sharing the same flex circuit, a multi-camera system may include one or more additional flex circuits (that is, in addition to the single flex circuit) in various embodiments within the scope of the present disclosure.

In various embodiments, the single flex circuit may include a first portion, a second portion, and a third portion. The first portion of the single flex circuit may be coupled with a first camera of the multi-camera system. The second portion of the single flex circuit may be coupled with a second camera of the multi-camera system. The second portion may include a service loop proximate the second camera. The third portion of the single flex circuit may include a connector for connecting the single flex circuit to one or more other components. The single flex circuit may be configured to convey electrical signals between the connector and each of the first camera and the second camera.

Compared to some other multi-camera systems that include multiple flex circuits (e.g., a respective flex circuit for each camera) and a flex-to-flex interconnect (e.g., a hot bar interconnect) to connect the multiple flex circuits, embodiments of the multi-camera systems of the present disclosure may utilize a single flex circuit to convey electrical signals between a connector each of multiple cameras. By utilizing the single flex circuit, a multi-camera system may not include a flex-to-flex interconnect. Additionally, the service loop of the single flex circuit may provide compliance to motion in multiple axes, so as to reduce reaction forces acting on the single flex circuit when positioning one camera with respect to another camera in an active alignment process.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1A illustrates a schematic perspective view of an example multi-camera system 100 that may include multiple cameras that are each coupled to a single flex circuit 102. According to various embodiments, FIG. 1A illustrates that the multi-camera system 100 may include at least a first camera 108 and a second camera 110, and the single flex circuit 102 is shared by the first camera 108 and the second camera 110. In alternative embodiments, the multi-camera system 100 may include an alternative number and/or arrangement of cameras that are each coupled to the single flex circuit 102.

FIG. 1A illustrates that the multi-camera system 100 may include a chassis 112 that is configured to receive multiple cameras, according to various embodiments. For example, FIG. 1A illustrates that the first camera 108 and the second camera 110 are mounted in the chassis 112, and the chassis 112 fixes the position of the first camera 108 relative to the second camera 110. In FIG. 1A, the first camera 108 and the second camera 110 are fixedly mounted to the chassis 112.

FIG. 1A illustrates that the single flex circuit 102 may have various design features, according to various embodiments. For example, the single flex circuit 102 may include a first portion coupled with the first camera 108 and a second portion coupled with the second camera 110. As described herein with reference to FIGS. 3 and 4, anisotropic conductive film (ACF) attachment processes may be used, e.g., to fixedly attach the first portion of the single flex circuit 102 to the first camera 108 and/or to fixedly attach the second portion of the single flex circuit 102 to the second camera 110. However, it should be understood that one or more other types of attachment processes (e.g., SMT, hot bar, etc.) may be used in various embodiments. In the schematic perspective view depicted in FIG. 1A, some areas of the single flex circuit 102 are obscured from view by the chassis 112 (e.g., areas of the single flex circuit 102 on which the first camera 108 and the second camera 110 are mounted during assembly), as described further herein. With regard to the unobscured areas of the single flex circuit 102, FIG. 1A illustrates that the second portion of the single flex circuit 102 (that is coupled to the second camera 110) includes service loop 120 proximate the second camera 110.

FIG. 1A illustrates that the single flex circuit 102 includes a third portion, comprising a connector 122 for connecting the single flex circuit 102 to one or more other components (not shown). According to various embodiments, the single flex circuit 102 may be configured to convey electrical signals between the connector 122 and each of the first camera 108 and the second camera 110. FIG. 1A illustrates that the third portion of the single flex circuit 102 (that comprises the connector 122) may be located outside of the chassis 112, according to various embodiments.

As described herein, the second camera 110 may be actively aligned with the first camera 108 using an active alignment process, according to various embodiments. The service loop 120 may provide compliance to motion in multiple axes, so as to reduce reaction forces acting on the single flex circuit 102 when positioning the second camera 110 in the active alignment process, relative to reaction forces that would be acting on the single flex circuit 102 during the active alignment process if the single flex circuit 102 did not include the service loop 120. FIG. 1A illustrates that the service loop 120 may include one or more bends, as illustrated and further described herein with respect to FIGS. 5-9 (which depict various examples of "accordion shaped" service loops).

Figure 2B:
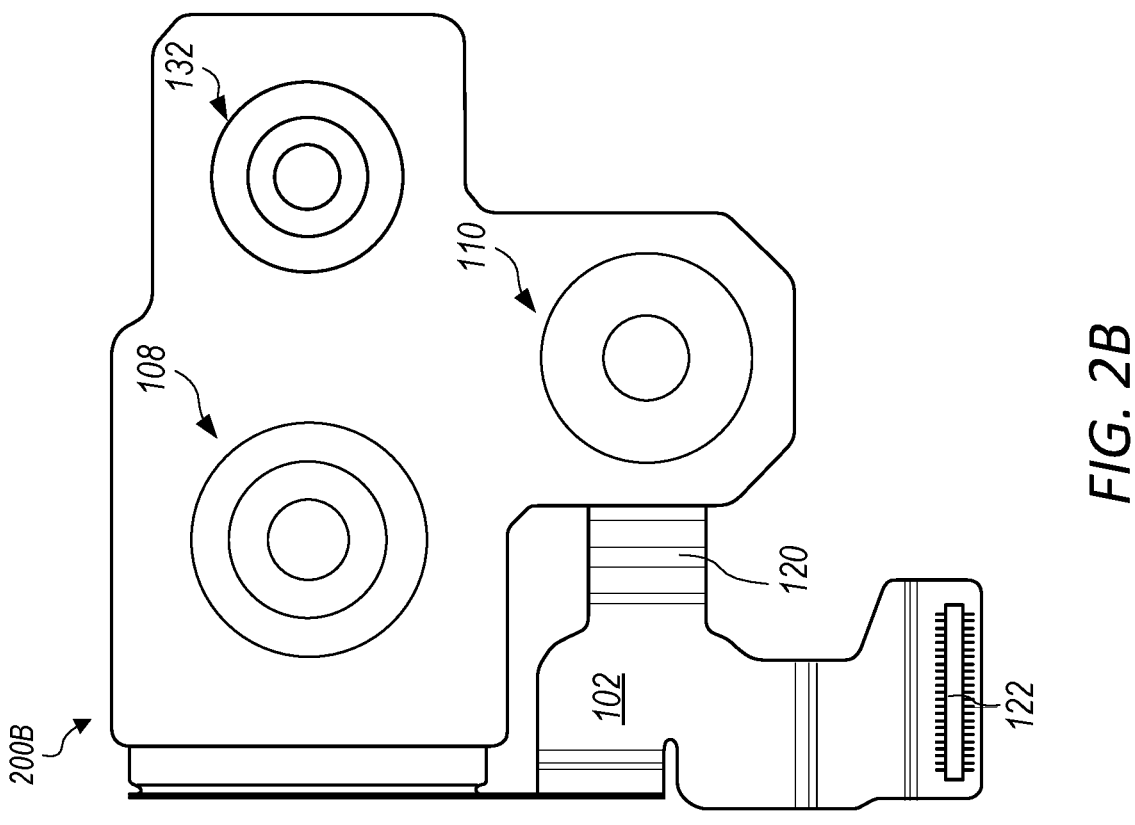
FIG. 2B illustrates a schematic top view of an example multi-camera system that may include a single flex circuit utilized by multiple cameras in contrast to the example depicted in FIG. 2A, in accordance with some embodiments.

FIG. 1B illustrates a schematic top view of the example multi-camera system 100 depicted in FIG. 1A. According to various embodiments, FIG. 1B illustrates that the multi-camera system 100 may further utilize a portion 130 of the chassis 112 that includes an opening (identified by dashed lines) to receive an (optional) third camera 132. FIG. 2B depicts an example in which the portion 130 of the chassis 112 includes such an optional third camera 132 (that may be fixedly mounted to chassis 112). While not shown in the examples depicted in FIGS. 1A and 1B, in such cases, the single flex circuit 102 may be shared by the first camera 108, the second camera 110, and the third camera 132, according to some embodiments.

Thus, FIGS. 1A and 1B illustrate different views of the multi-camera system 100 that includes the single flex circuit 102 that is shared by at least the first camera 108 and the second camera 110. In contrast to designs that utilize multiple flex circuits for each individual camera to convey electrical signals (see e.g., FIG. 2A), the multi-camera system 100 of FIGS. 1A and 1B utilize the single flex circuit 102 to convey electrical signals between the connector 122 and each of the first camera 108 and the second camera 110. Additionally, as described herein, the service loop 120 of the single flex circuit 102 may provide compliance to motion in multiple axes, so as to reduce reaction forces acting on the single flex circuit 102 when positioning the second camera in the active alignment process.

Figure 2A:
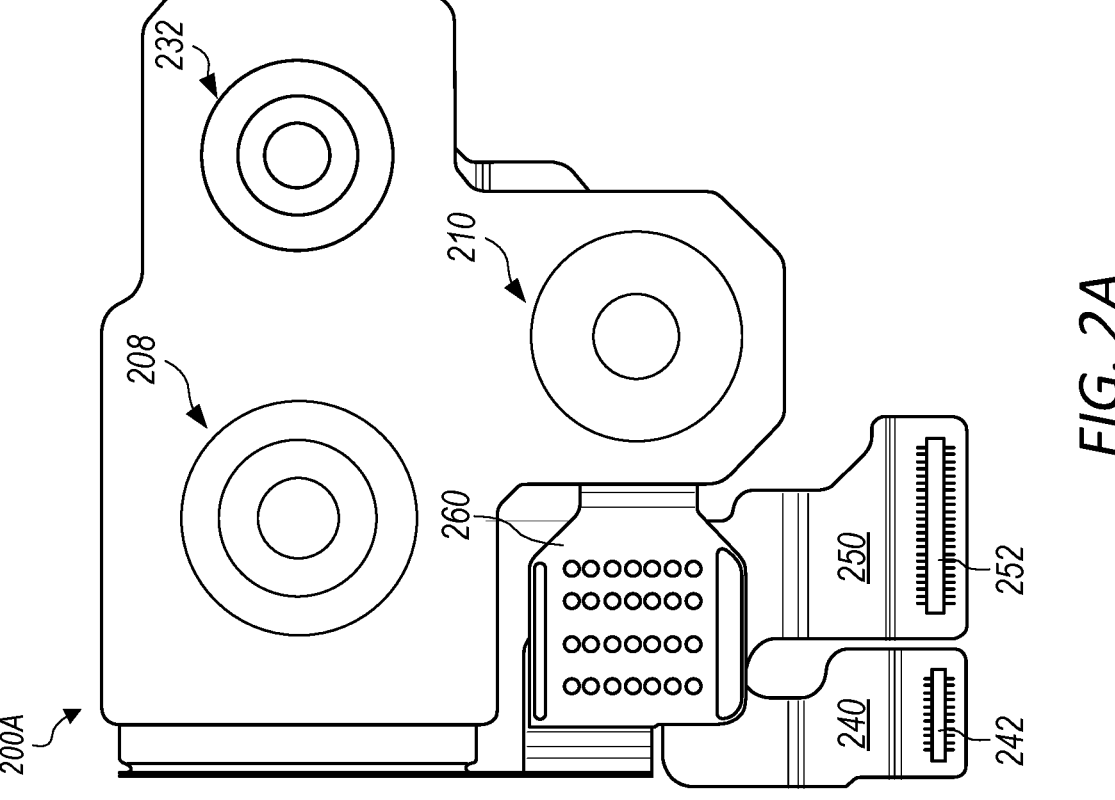
FIG. 2A illustrates a schematic top view of an example multi-camera system that includes multiple flex circuits and flex-to-flex interconnection, in accordance with some embodiments.

FIG. 2A illustrates a schematic top view of an example multi-camera system 200A that includes multiple flex circuits and a flex-to-flex interconnect (e.g., a hot bar interconnect) to connect the multiple flex circuits. For purposes of comparison to the example multi-camera system 200A depicted in FIG. 2A, FIG. 2B illustrates a schematic top view of an example multi-camera system 200B that may include the single flex circuit 102 without such a flex-to-flex interconnect. According to various embodiments, the multi-camera system 200B depicted in FIG. 2B may correspond to the multi-camera system 100 depicted in FIG. 1B.

In the example depicted in FIG. 2A, the camera system 200 includes a dual camera module that is based on two single cameras, manufactured separately, with different optical characteristics. The two cameras are aligned optically individually, separately first, on individual flexes 240 and

250, respectively. The two cameras are actively aligned together mechanically, and optically, during final assembly. With the dual camera module depicted in FIG. 2A, interconnection is through individual connectors 242 and 252, respectively, or a flex-to-flex interconnect 260 (e.g., a hot bar interconnect).

Various challenges are associated with the aforementioned design and process associated with the example depicted in FIG. 2A. As an example, there are challenges in mechanical alignment with components manufactured separately. As another example, there are significant challenges in optical alignment with two individual cameras. As another example, there are challenges with interconnection, through separated, individual flex alignment, with hot bar interconnection between two flexes, or individual connector. As another example, there are challenges with long assembly flow, with several un-required assembly steps (e.g., bend, hot bar, etc.). Additionally, the aforementioned design and process associated with the example depicted in FIG. 2A may present challenges with respect to satisfying design constraints, such as size, due to use of individual flex circuits and design requirements for alignment and interconnection. Additionally, the aforementioned design and process associated with the example depicted in FIG. 2A may be associated with unsatisfactory electrical performance, as the cameras are powered up individually through individual flexes, and the cameras are interconnected through a connector (or hot bar soldering).

In contrast to the multi-camera system 200B of FIG. 2A which utilizes multiple flexes 240, 250 and the flex-to-flex interconnect 260, the example multi-camera system 200B depicted in FIG. 2B utilizes one flex circuit (i.e., the single flex circuit 102) to convey electrical signals between the connector 122 and each of the first camera 108 and the second camera 110. By utilizing the single flex circuit 102, FIG. 2B illustrates that the example multi-camera system 200B does not include a flex-to-flex interconnect as there are not multiple flex circuits to be connected.

Additionally, the service loop 120 of the single flex circuit 102 of the example multi-camera system 200B of FIG. 2B may provide compliance to motion in multiple axes, so as to reduce reaction forces acting on the single flex circuit 102 when positioning the second camera in the active alignment process.

In FIG. 2B, the example multi-camera system 200B includes the (optional) third camera 132, which may be fixedly mounted to the chassis 112 (as previously described herein with respect to FIG. 1B), according to some embodiments.

Thus, the example multi-camera system 200A of FIG. 2A and the example multi-camera system 200B of FIG. 2B are presented for side-by-side comparison in order to illustrate various advantages associated with the present disclosure.

Figure 3:
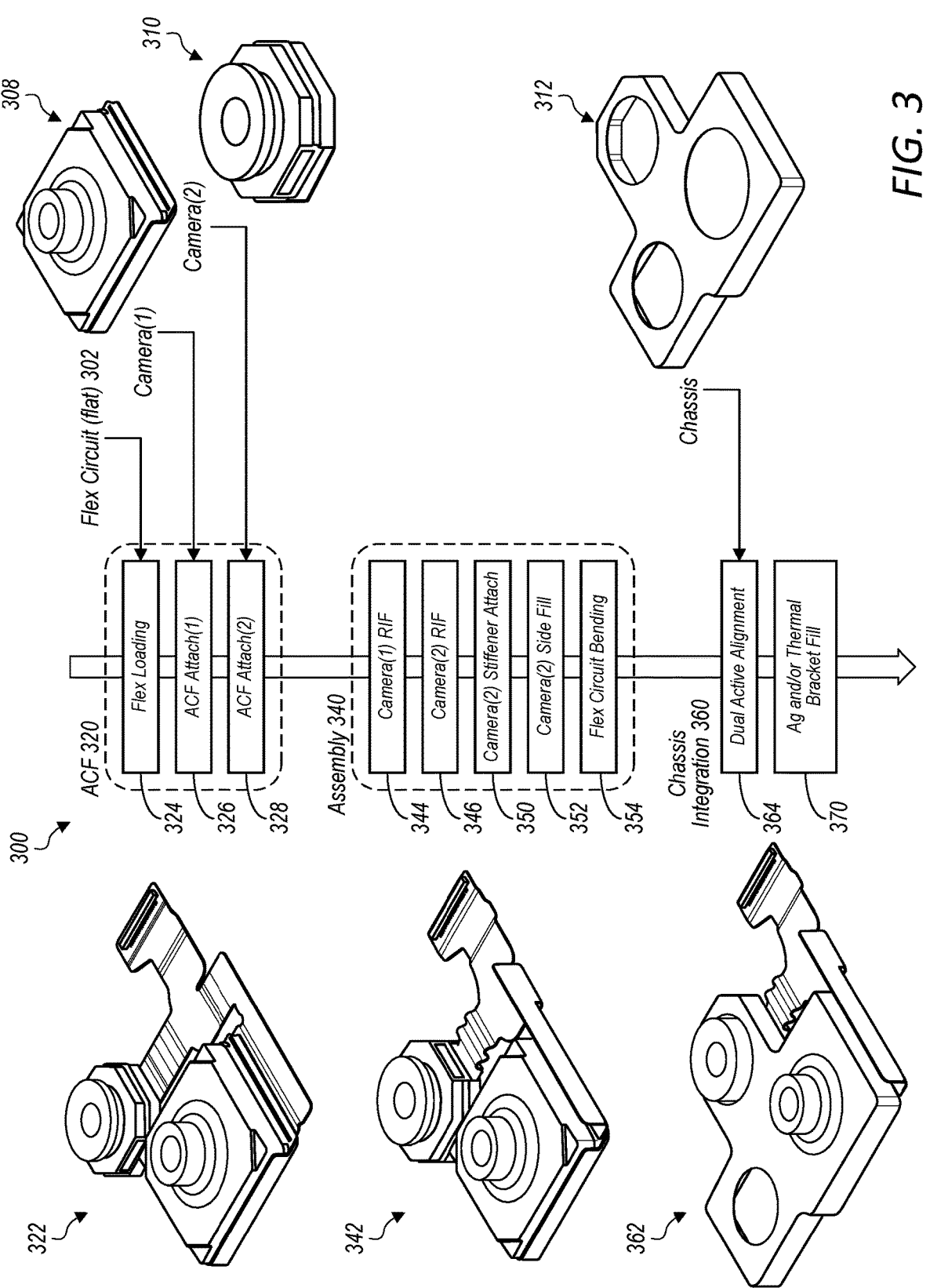
FIG. 3 illustrates multiple views of various stages of a method of producing a multi-camera system that includes a single flex circuit utilized by multiple cameras, in accordance with some embodiments.

FIG. 3 illustrates multiple views of various stages of a method 300 of producing a multi-camera system that includes a single flex circuit utilized by multiple cameras, in accordance with some embodiments. According to various embodiments, the method 300 may include anisotropic conductive film (ACF) operations 320 (with dashed lines surrounding individual operations) (and/or one or more other types of attachment processes), including a first perspective view 322 (depicted on the left side of FIG. 3) of a result of performing the ACF operations 320. According to various embodiments, the method 300 may subsequently include assembly operations 340 (with dashed lines surrounding individual operations), including a second perspective view 342 (depicted on the left side of FIG. 3) of a result of performing the assembly operations 340. According to various embodiments, the method 300 may subsequently include chassis integration operations 360, including a third perspective view 362 (depicted on the left side of FIG. 3) of a result of performing the chassis integration operations 360.

The right side of the example method 300 depicted in FIG. 3 illustrates that a (flat) flex circuit 302, a first camera 308, and a second camera 310 may be utilized as part of the ACF operations 320. According to various embodiments, the flex circuit 302 may correspond to a flat version of the single flex circuit 102 depicted in FIGS. 1A and 1B, prior to the single flex circuit 102 underdoing bending operations (also referred to herein as "accordion bending" operations) associated with producing the multi-camera system 100. According to various embodiments, the first camera 308 depicted in FIG. 3 may correspond to the first camera 108 depicted in FIGS. 1A and 1B, prior to assembly into the multi-camera system 100. According to various embodiments, the second camera 310 depicted in FIG. 3 may correspond to the second camera 110 depicted in FIGS. 1A and 1B, prior to assembly into the multi-camera system 100. The right side of the example method 300 depicted in FIG. 3 further illustrates that a chassis 312 may be utilized as part of the chassis integration operations 360. According to various embodiments, the chassis 312 depicted in FIG. 3 may correspond to the chassis 112 depicted in FIGS. 1A and 1B, prior to assembly into the multi-camera system 100.

According to various embodiments, FIG. 3 illustrates that the ACF operations 320 may include at least: a flex loading operation 324; a first ACF attach operation 326; and a second ACF attach operation 328.

With respect to the flex loading operation 324, the flex circuit 302 in its flattened state may include at least a first ACF pad (obscured from view in FIG. 3) for ACF attachment of the first camera 308 and a second ACF pad (obscured from view in FIG. 3) for ACF attachment of the second camera 310.

With respect to the first ACF attach operation 326, a first type of ACF bonder may be utilized. For example, an ACF lamination operation may be performed on a particular area of a mounting side (not shown) of the first camera 308, and flex PnP mounting may be performed to attach the first camera 308 onto the first ACF pad of the flex circuit 302, with the ACF bonder compressing the ACF laminate material between the mounting side of the first camera 308 and the first ACF bond pad of the flex circuit 302.

With respect to the second ACF attach operation 328, a second type of ACF bonder may be utilized for reverse ACF bonding. For example, a reverse ACF lamination operation may involve ACF lamination onto the second ACF pad of the flex circuit 302, followed by alignment of a particular area of a mounting side (not shown) of the second camera 310 with the ACF lamination on the second ACF bond pad. A bond tool may then be utilized to compress the ACF laminate material between the mounting side of the second camera 310 and the second ACF bond pad of the flex circuit 302.

The first perspective view 322 (depicted on the left side of FIG. 3) illustrates an example of a result of performing the ACF operations 320, according to some embodiments.

According to various embodiments, FIG. 3 illustrates that the assembly operations 340 may include at least: a reinforcement process (RIF) operation 344 for the first camera 308; an RIF operation 346 for the second camera 310; a stiffener attachment operation 350 for the second camera 310; a side fill operation 352 for the second camera 310; and one or more flex circuit bending operations 354.

With respect to the flex circuit bending operation(s) 354 (also referred to herein as "accordion bending"), the method 300 may include bending the (flat) flex circuit 302 to form a particular bend design for the service loop proximate the second camera 310 (e.g., the particular bend design for the service loop 120, as depicted in the side perspective view of FIG. 1A). As described herein, the service loop proximate the second camera 310 provides compliance to motion in multiple axes, so as to reduce reaction forces acting on the flex circuit when positioning the second camera 310 in the active alignment process (as described herein with respect to the chassis integration operations 360), relative to reaction forces that would be acting on the flex circuit during the active alignment process if the flex circuit did not include the service loop (e.g., the area of the flex circuit 302 proximate the second camera 310, as depicted in the first side perspective view 322 on the left side of FIG. 3). According to some embodiments, the flex circuit bending operation(s) 354 may result in the service loop having a particular bend design with one or more bends (e.g., an accordion shape), as illustrated and further described herein with respect to FIGS. 5-9.

The second perspective view 342 (depicted on the left side of FIG. 3) illustrates an example of a result of performing the assembly operations 340, according to some embodiments.

According to various embodiments, FIG. 3 illustrates that the chassis integration operations 360 may include at least a dual active alignment operation 364. FIG. 3 further illustrates that, according to some embodiments, the chassis integration operations 360 may further include silver (Ag) and/or thermal bracket fill operation(s) 370.

With respect to the dual active alignment operation 364, the method 300 may include performing one or more active alignment operations to align the second camera 310 with the first camera 308, after positioning of the cameras 308, 310 into the respective openings within the chassis 312.

With respect to the Ag and/or thermal bracket fill operation(s) 370, the method 300 may include dispensing a silver (Ag) material and/or dispensing a thermal fill material to secure the first camera 308 and/or the second camera 310 to the chassis 312. As used herein, the Ag material may be a non-limiting example of a conductive adhesive. In various embodiments, a conductive adhesive may be used to provide an electrical ground path from the first camera 308 to the chassis 312 and/or from the second camera 310 to the chassis 312. It should be understood that other conductive materials may be used in addition to, or instead of, the Ag material according to various embodiments within the scope of the present disclosure.

The third perspective view 362 (depicted on the left side of FIG. 3) illustrates an example of a result of performing the chassis integration operations 360, according to some embodiments.

Thus, FIG. 3 illustrates an example of various stages of producing a multi-camera system that includes a single flex circuit utilized by multiple cameras. The first perspective view 322 of FIG. 3 depicts an example of a result of performing the various ACF operations 320, as described herein. The second perspective view 342 of FIG. 3 depicts an example of a result of performing the various assembly operations 340, as described herein. The third perspective view 362 depicts an example of a result of performing the various chassis integration operations 360, as described herein.

Figure 4:
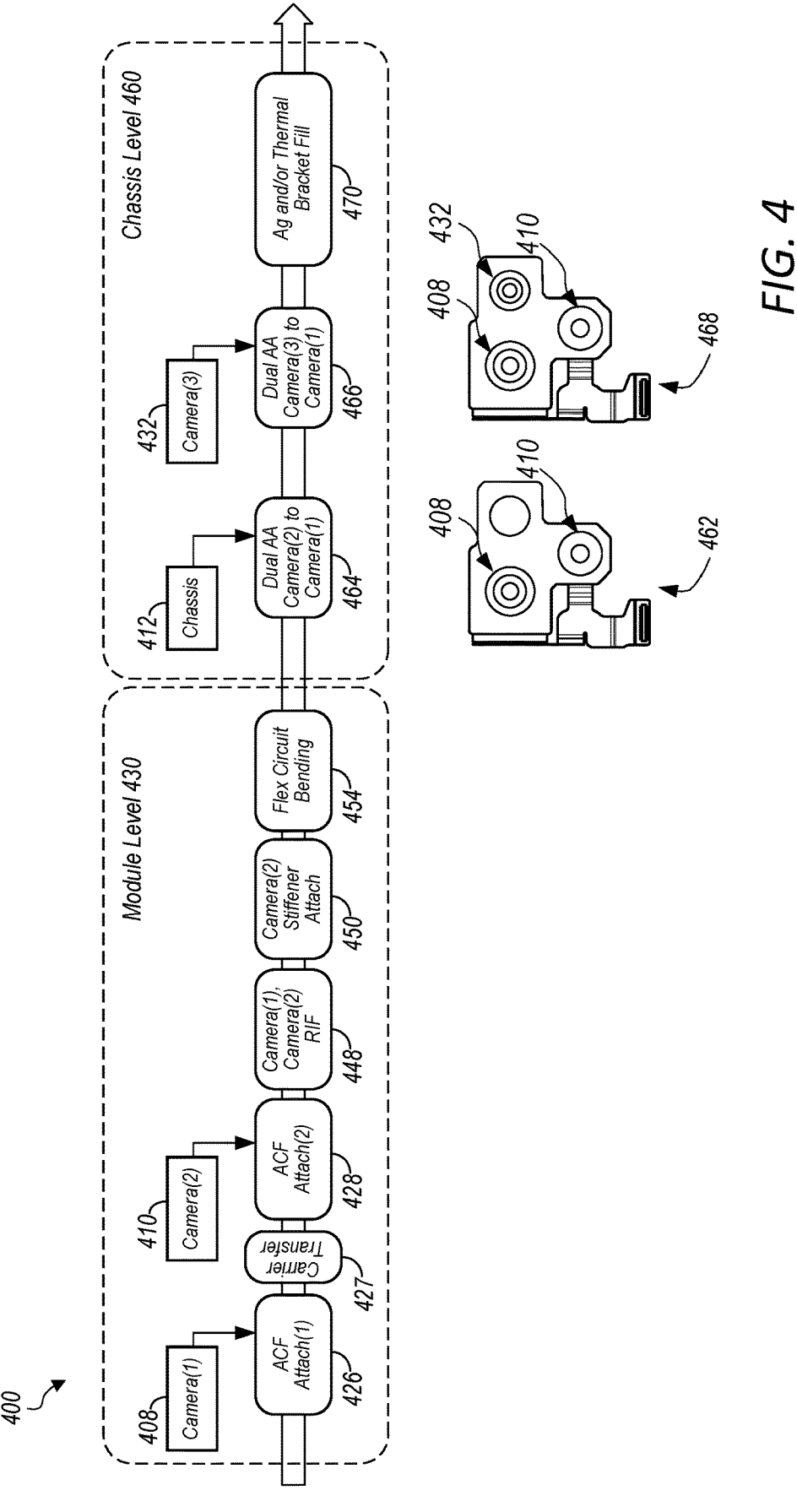
FIG. 4 illustrates an example method of producing a multi-camera system that includes a single flex circuit utilized by multiple cameras, in accordance with some embodiments.

FIG. 4 illustrates an example of various stages of a method 400 of producing a multi-camera system that includes a single flex circuit utilized by multiple cameras, in accordance with some embodiments. According to various embodiments, the method 400 may include module level operations 430 (with dashed lines surrounding individual operations). According to various embodiments, the method 400 may include chassis level operations 460 (with dashed lines surrounding individual operations), including two top views (depicted on the bottom of FIG. 4) associated with results of performing particular individual operations of the chassis level operations 460. FIG. 4 illustrates that, in some embodiments, the module level operations 430 may involve a first camera 408 and a second camera 410, and the chassis level operations 460 may involve an (optional) third camera 432. For example, the first camera 408 depicted in FIG. 4 may correspond to the first camera 108 depicted in FIG. 2B, the second camera 410 depicted in FIG. 4 may correspond to the second camera 110 depicted in FIG. 2B, and the (optional) third camera 432 depicted in FIG. 4 may correspond to the third camera 132 depicted in FIG. 2B.

According to various embodiments, FIG. 4 illustrates that the module level operations 430 may include at least: a first ACF attach operation 426 for a first camera 408; a carrier transfer operation 427; a second ACF attach operation 428 for a second camera 410; RIF operations 448 for the first camera 408 and the second camera 410; a stiffener attachment operation 450 for the second camera 410; and one or more flex circuit bending operations 454.

With respect to the first ACF attach operation 426, a first type of ACF bonder may be utilized. For example, as previously described herein with respect to FIG. 3, an ACF lamination operation may be performed on a particular area of a mounting side of the first camera 408, and flex PnP mounting may be performed to attach the first camera 408 onto a first ACF pad of a (flat) flex circuit (not shown in FIG. 4), with the ACF bonder compressing the ACF laminate material between the mounting side of the first camera 408 and the first ACF bond pad of the (flat) flex circuit.

With respect to the second ACF attach operation 428, a second type of ACF bonder may be utilized for reverse ACF bonding. Accordingly, FIG. 4 depicts the carrier transfer operation 427, which may include transferring the (flat) flex circuit from the first type of ACF bonder (after the first ACF attach operation 426 of the first camera 408) to the second type of ACF bonder (e.g., a 2:1 reverse ACF bonder) prior to performing the second ACF attach operation 428. For example, as previously described herein with respect to FIG. 3, the second ACF attach operation 428 may involve ACF lamination onto a second ACF pad of the (flat) flex circuit (not shown in FIG. 4), followed by alignment of a particular area of a mounting side of the second camera 410 with the ACF lamination on the second ACF bond pad. A bond tool may then be utilized to compress the ACF laminate material between the mounting side of the second camera 410 and the second ACF bond pad of the (flat) flex circuit.

While not shown in FIG. 4, performing this particular subset of the module level operations 430 may result in a partially-completed multi-camera system with features similar to the first perspective view 322 (depicted on the left side of FIG. 3).

With respect to the remaining subset of the module level operations 430, FIG. 4 illustrates that the RIF operations 448 for the first camera 408 and the second camera 410 may be performed after completion of the second ACF attach operation 428. For example, as previously described herein with respect to FIG. 3, the RIF operations 448 for the first camera 408 and the second camera 410 may include reinforcing the attachments of the "necks" of the first camera 408 and the second camera 410 to the (flat) flex circuit (not shown in FIG. 4).

FIG. 4 further illustrates that, after completion of the RIF operations 448, the module level operations 430 may include the stiffener attachment operation 450 for the second camera 410. For example, as previously described herein with respect to FIG. 3, the stiffener attachment operation 450 may include attaching a stiffener to the second camera 410.

FIG. 4 further illustrates that, after completion of the stiffener attachment operation 450, the module level operations 430 may include performing the flex circuit bending operation(s) 454. For example, as previously described herein with respect to FIG. 3, the flex circuit bending operation(s) 454 may include bending the (flat) flex circuit (not shown in FIG. 4) to form a particular bend design for the service loop of the flex circuit proximate the second camera 410 (e.g., the particular bend design for the service loop 120, as depicted in the side perspective view of FIG. 1A). As described herein, the service loop proximate the second camera 410 provides compliance to motion in multiple axes, so as to reduce reaction forces acting on the flex circuit (not shown in FIG. 4) when positioning the second camera 410 in the active alignment process (as described herein with respect to the chassis level operations 460), relative to reaction forces that would be acting on the flex circuit during the active alignment process if the flex circuit did not include the service loop. According to some embodiments, the flex circuit bending operation(s) 454 may result in the service loop having a particular bend design with one or more bends (e.g., an accordion shape), as illustrated and further described herein with respect to FIGS. 5-9.

While not shown in FIG. 4, performing this particular subset of the module level operations 430 may result in a partially-completed multi-camera system with features similar to the second perspective view 342 (depicted on the left side of FIG. 3).

According to various embodiments, FIG. 4 illustrates that the chassis level operations 460 may include at least a first dual active alignment operation 464 and a second dual active alignment operation 466. FIG. 4 further illustrates that, according to some embodiments, the chassis level operations 460 may further include silver (Ag) and/or thermal bracket fill operation(s) 470.

With respect to the first dual active alignment operation 464, the method 400 may include performing one or more active alignment operations to align the second camera 410 with the first camera 408. According to some embodiments, the first dual active alignment operation 464 may be similar to the dual active alignment operation 364 previously described herein with respect to FIG. 3 (in which the second camera 310 is actively aligned with the first camera 308). The first dual active alignment operation 464 may be performed after positioning of the cameras 408, 410 into the respective openings within a chassis 412. For example, the chassis 412 depicted in the method 400 of FIG. 4 may have features similar to the chassis 312 depicted in FIG. 3. The bottom portion of FIG. 4 illustrates an example of a top view 462 of a result of performing the first dual active alignment operation 464, illustrating the first camera 408 and the second camera 410 positioned within the chassis 412.

With respect to the second dual active alignment operation 466, the method 400 may include performing one or more active alignment operations to align the (optional) third camera 432 with the first camera 408, after positioning of the third camera 432 into a portion of the chassis 412 that includes an opening to receive the third camera 432 (see e.g., the portion 130 of the chassis 112 depicted in FIG. 1B). According to some embodiments, the second dual active alignment operation 466 may be performed in a similar manner to the first dual active alignment operation 464, but with the third camera 432 being actively aligned with the first camera 408 instead of the second camera 410 being actively aligned with the first camera 408.

The bottom portion of FIG. 4 illustrates an example of a top view 468 of a result of performing the second dual active alignment operation 466, illustrating the third camera 432 positioned within the chassis 412 (along with the first camera 408 and the second camera 410).

According to some embodiments, the Ag and/or thermal bracket fill operation(s) 470 of FIG. 4 may be performed in a similar manner to the Ag and/or thermal bracket fill operation(s) 370 previously described herein with respect to FIG. 3, but with the third camera 432 also secured onto the chassis 412 along with the first camera 408 and the second camera 410.

Thus, FIG. 4 illustrates an example of various stages of producing a multi-camera system that includes a single flex circuit utilized by multiple cameras. In FIG. 4, the method 400 of producing the multi-level camera system includes various module level operations 430 and various chassis level operations 460. FIG. 4 illustrates that, in some embodiments, the multi-level camera system may include more than two cameras. Additionally, FIG. 4 illustrates that, in some embodiments, additional dual active alignment operation(s) may be performed to actively align each additional camera, such as the second dual active alignment operation 466 that is performed to actively align the third camera 432 with the first camera 408. While FIG. 4 depicts one example of a multi-camera system with three cameras, it will be appreciated that similar additional dual active alignment operation(s) may be performed to actively align an alternative number and/or arrangement of cameras for an alternative multi-camera system.

FIG. 5 illustrates a schematic cross-sectional side view 500 of an example flex circuit 502 with a service loop 520 having a particular bend design. According to some embodiments, the flex circuit 502 with the service loop 520 depicted in FIG. 5 may correspond to the single flex circuit 102 having the service loop 120 proximate the second camera 110, as illustrated in FIGS. 1A, 1B, and 2B and previously described herein.

While not shown in FIG. 5, the service loop 520 may be proximate to a second camera for dual active alignment with a first camera. The service loop 520 may provide compliance to motion in multiple axes, so as to reduce reaction forces acting on the flex circuit 502 when positioning the second camera in the active alignment process. As one example, the service loop 520 may be proximate to the second camera 310 depicted in FIG. 3 for dual active alignment with the first camera 308, as previously described herein with respect to the dual active alignment operation 364 of the method 300 of FIG. 3. In this case, the service loop 520 may provide compliance to motion in multiple axes, so as to reduce reaction forces acting on the flex circuit 502 when positioning the second camera 310 in the active alignment process with the first camera 308 (during the dual active alignment operation 364). As another example, the service loop 520 may be proximate to the second camera 410 depicted in FIG. 4 for dual active alignment with the first camera 408, as previously described herein with respect to the first dual active alignment operation 464 of the method 400 of FIG. 4. In this case, the service loop 520 may provide compliance to motion in multiple axes, so as to reduce reaction forces acting on the flex circuit 502 when positioning the second camera 410 in the active alignment process with the first camera 408 (during the first dual active alignment operation 464).

According to various embodiments, the service loop 520 depicted in FIG. 5 may be formed according to the flex circuit bending operation 354 previously described herein with respect to the method 300 of FIG. 3. FIG. 5 illustrates that the service loop 520 may comprise one or more bends, according to some embodiments. In the example depicted in FIG. 5, the service loop 520 includes multiple bends (e.g., two bends) in an accordion arrangement.

The bottom portion of FIG. 5 shows dashed lines to illustrate a callout for a particular portion of the flex circuit 502 corresponding to the service loop 520 (depicted in detail on the right side of FIG. 5). In the example depicted in FIG. 5, the flex circuit 502 has a characteristic dimension (represented by the reference character "A"), with the reference character "F" designating a flat portion of the service loop 520. The characteristic dimension A corresponds to a distance to a beginning of a first bend of the service loop 520 (and demarcated by a set of dashed lines above the flat portion of service loop 520). It should be noted that the line associated with this characteristic dimension of the flex circuit 502 (represented by the reference character "A") has been extended for illustrative purposes in FIG. 5.

In the example depicted in FIG. 5, the flex circuit 502 has a characteristic dimension (represented by the reference character "$R_E$") corresponding to a radius of curvature (degrees) at a first bend of the service loop 520. In FIG. 5, another characteristic dimension (represented by the reference character "B") corresponds to a distance between the beginning of the first bend (A) and the radius of curvature ($R_E$) at the first bend (demarcated by a set of dashed lines).

In the example depicted in FIG. 5, the flex circuit 502 has a characteristic dimension (represented by the reference character "H") corresponding to a height of the first bend (with respect to the flat portion of the service loop 520 represented by the reference character "F"). In the example depicted in FIG. 5, the flex circuit has a characteristic dimension (represented by the reference character "C") corresponding to a distance between the first bend of the service loop 520 and a second bend of the service loop 520. A set of dashed lines under the second bend of the service loop 520 demarcates a location of the beginning of the second bend of the service loop 520.

FIGS. 6 to 9 illustrate cross-sectional side views of various alternative designs for the service loop 520 of the flex circuit 502 depicted in FIG. 5, in accordance with some embodiments.

Figure 6:
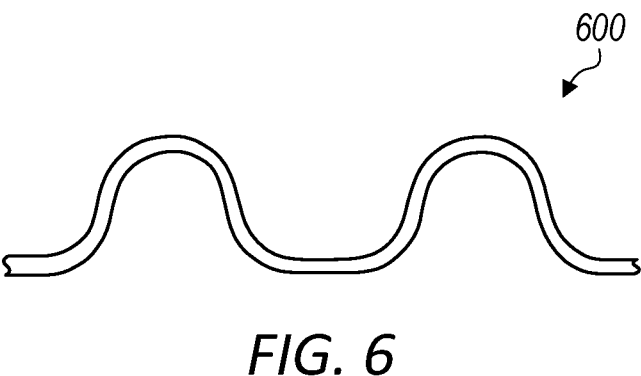
FIGS. 6 to 9 illustrate cross-sectional side views of various alternative bend designs for the service loop of the flex circuit, in accordance with some embodiments.

Referring to FIG. 6, a cross-sectional side view 600 of a first bend design for the service loop 520 of the flex circuit 502 of FIG. 5 is illustrated.

According to some embodiments, the first bend design for the service loop 520 of FIG. 5 may have the following approximate characteristic dimensions: 0.840 mm ("A"); 0.500 degrees ($R_E$); 1.000 mm ("B"); 1.000 mm ("H"); and 2.500 mm ("C").

Figure 7:
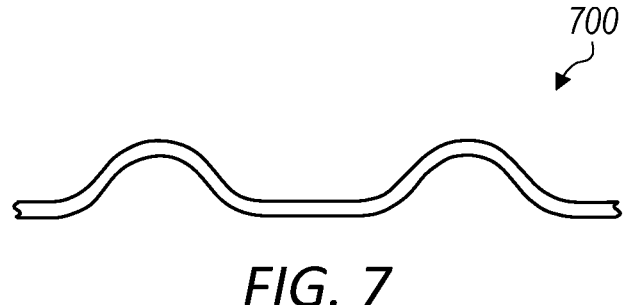

Referring to FIG. 7, a cross-sectional side view 700 of a second bend design for the service loop 520 of the flex circuit 502 of FIG. 5 is illustrated. Compared to the first bend design depicted in FIG. 6, the second bend design has a relatively reduced bend height ("H").

According to some embodiments, the second bend design for the service loop 520 of FIG. 5 may have the following approximate characteristic dimensions: 0.840 mm ("A"); 0.500 degrees ($R_E$); 1.000 mm ("B"); 0.500 mm ("H"); and 2.500 mm ("C").

Figure 8:
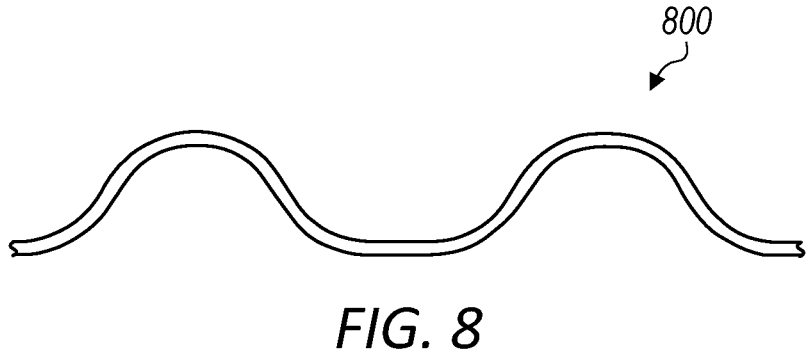

Referring to FIG. 8, a cross-sectional side view 800 of a third bend design for the service loop 520 of the flex circuit 502 of FIG. 5 is illustrated. Compared to the first bend design depicted in FIG. 6, the third bend design has a relatively increased bend length ("B") and bend height ("H"), a relatively increased distance between the two bends ("C"), and a relatively increased radius of curvature ("$R_E$").

According to some embodiments, the third bend design for the service loop 520 of FIG. 5 may have the following approximate characteristic dimensions: 0.840 mm ("A"); 0.800 degrees ($R_E$); 1.450 mm ("B"); 0.920 mm ("H"); and 3.400 mm ("C").

Figure 9:
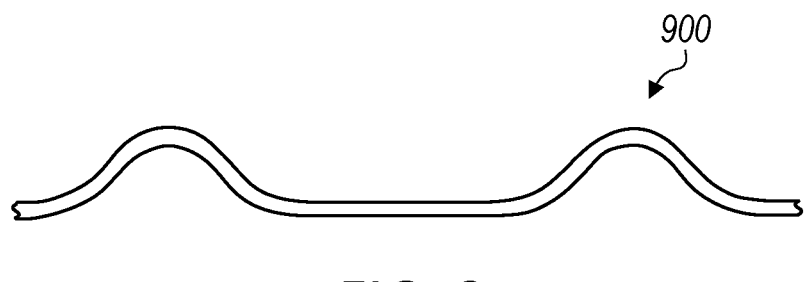

Referring to FIG. 9, a cross-sectional side view 900 of a fourth bend design for the service loop 520 of the flex circuit 502 of FIG. 5 is illustrated. Compared to the third bend design depicted in FIG. 8, the fourth bend design has a relatively reduced bend height ("H").

According to some embodiments, the fourth bend design for the service loop 520 of FIG. 5 may have the following approximate characteristic dimensions: 0.840 mm ("A"); 0.800 degrees ($R_E$); 1.450 mm ("B"); 0.500 mm ("H"); and 3.400 mm ("C").

Thus, FIGS. 6 to 9 illustrate various examples of alternative bend designs for a service loop of the single flex circuit of the present disclosure. While not shown in FIGS. 6 to 9, the service loop may be proximate to a second camera for dual active alignment with a first camera, and the service loop may provide compliance to motion in multiple axes, so as to reduce reaction forces acting on the single flex circuit when positioning the second camera in the active alignment process, relative to reaction forces that would be acting on the single flex circuit during the active alignment process if the single flex circuit did not include the service loop.

FIG. 10 is a flowchart 1000 of an example method of constructing a multi-camera system that comprises coupling a single flex circuit with a first camera and a second camera of the multi-camera system, in accordance with some embodiments.

At operation 1010, the method includes coupling a single flex circuit with a first camera and a second camera of the multi-camera system. For example, referring to referring to FIGS. 1A and 1B, the single flex circuit 102 may be coupled to the first camera 108 and the second camera 110.

At operation 1020, the coupling includes attaching a first portion of the single flex circuit to the first camera. For example, referring to FIGS. 1A and 1B, a first portion of the single flex circuit 102 may be attached to the first camera 108.

At operation 1030, the coupling includes attaching a second portion of the single flex circuit to the second camera. The second portion comprises a service loop proximate the second camera. For example, referring to FIGS. 1A and 1B, a second portion of the single flex circuit 102 may include the service loop 120 proximate the second camera 110 and may be attached to the second camera 110.

FIG. 10 further illustrates, at operation 1030, that a third portion of the single flex circuit comprises a connector for connecting the single flex circuit to one or more other components. For example, referring to FIGS. 1A and 1B, a third portion of the single flex circuit 102 may include the connector 122 for connecting the single flex circuit 102 to one or more other components (not shown).

FIG. 10 further illustrates, at operation 1030, that the single flex circuit is configured to convey electrical signals between the connector and each of the first camera and the second camera. For example, referring to FIGS. 1A and 1B, the single flex circuit 102 may be configured to convey electrical signals between the connector 122 and each of the first camera 108 and the second camera 110.

Thus, FIG. 10 illustrates an example of a method of constructing a multi-camera system that comprises coupling a single flex circuit with a first camera and a second camera of the multi-camera system.

Figure 11:
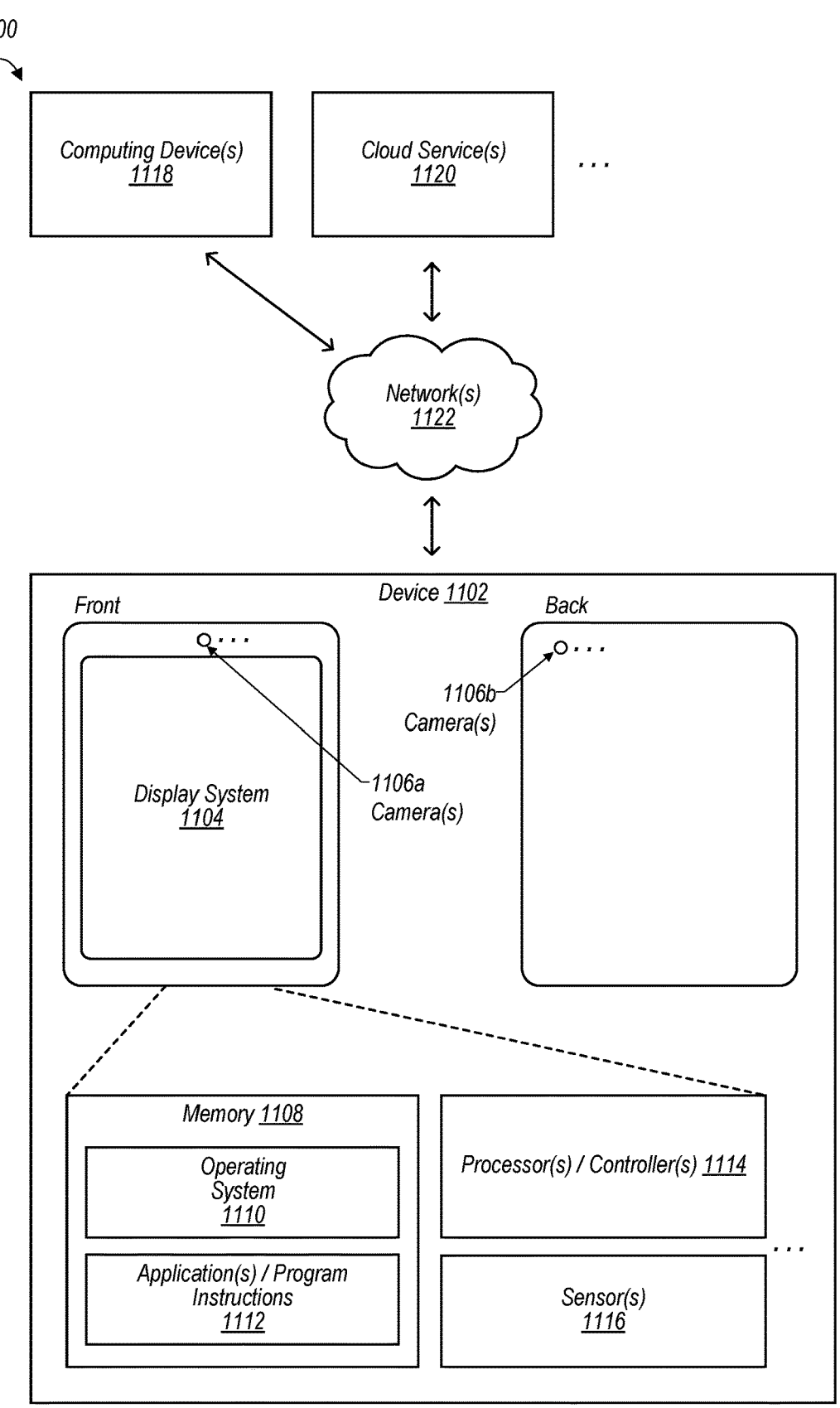
FIG. 11 illustrates a schematic representation of an example environment comprising a device that may include a multi-camera system with a single flex circuit utilized by multiple cameras, in accordance with some embodiments.

FIG. 11 illustrates a schematic representation of an example environment 1100 comprising a device 1102 that may include one or more cameras. For example, the device 1102 may include a camera system having multiple cameras with a single flex circuit having a flexible service loop (such as the multi-camera system 100 depicted in FIGS. 1A and 1B). In some embodiments, the device 1102 may be a mobile device and/or a multifunction device. In various embodiments, the device 1102 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1102 may include a display system 1104 (e.g., comprising a display and/or a touch-sensitive surface) and/or one or more cameras 1106. In some non-limiting embodiments, the display system 1104 and/or one or more front-facing cameras 1106a may be provided at a front side of the device 1102, e.g., as indicated in FIG. 11. Additionally, or alternatively, one or more rear-facing cameras 1106b may be provided at a rear side of the device 1102. In some embodiments comprising multiple cameras 1106, some or all of the cameras 1106 may be the same as, or similar to, each other. Additionally, or alternatively, some or all of the cameras 1106 may be different from each other. In various embodiments, the location(s) and/or arrangement(s) of the camera(s) 1106 may be different than those indicated in FIG. 11.

Among other things, the device 1102 may include memory 1108 (e.g., comprising an operating system 1110 and/or application(s)/program instructions 1112), one or more processors and/or controllers 1114 (e.g., comprising CPU(s), memory controller(s), display controller(s), and/or camera controller(s), etc.), and/or one or more sensors 1116 (e.g., orientation sensor(s), proximity sensor(s), and/or position sensor(s), etc.). In some embodiments, the device 1102 may communicate with one or more other devices and/or services, such as computing device(s) 1118, cloud service(s) 1120, etc., via one or more networks 1122. For example, the device 1102 may include a network interface (e.g., network interface 1212 in FIG. 12) that enables the device 1102 to transmit data to, and receive data from, the network(s) 1122. Additionally, or alternatively, the device 1102 may be capable of communicating with other devices via wireless communication using any of a variety of communications standards, protocols, and/or technologies.

Figure 12:
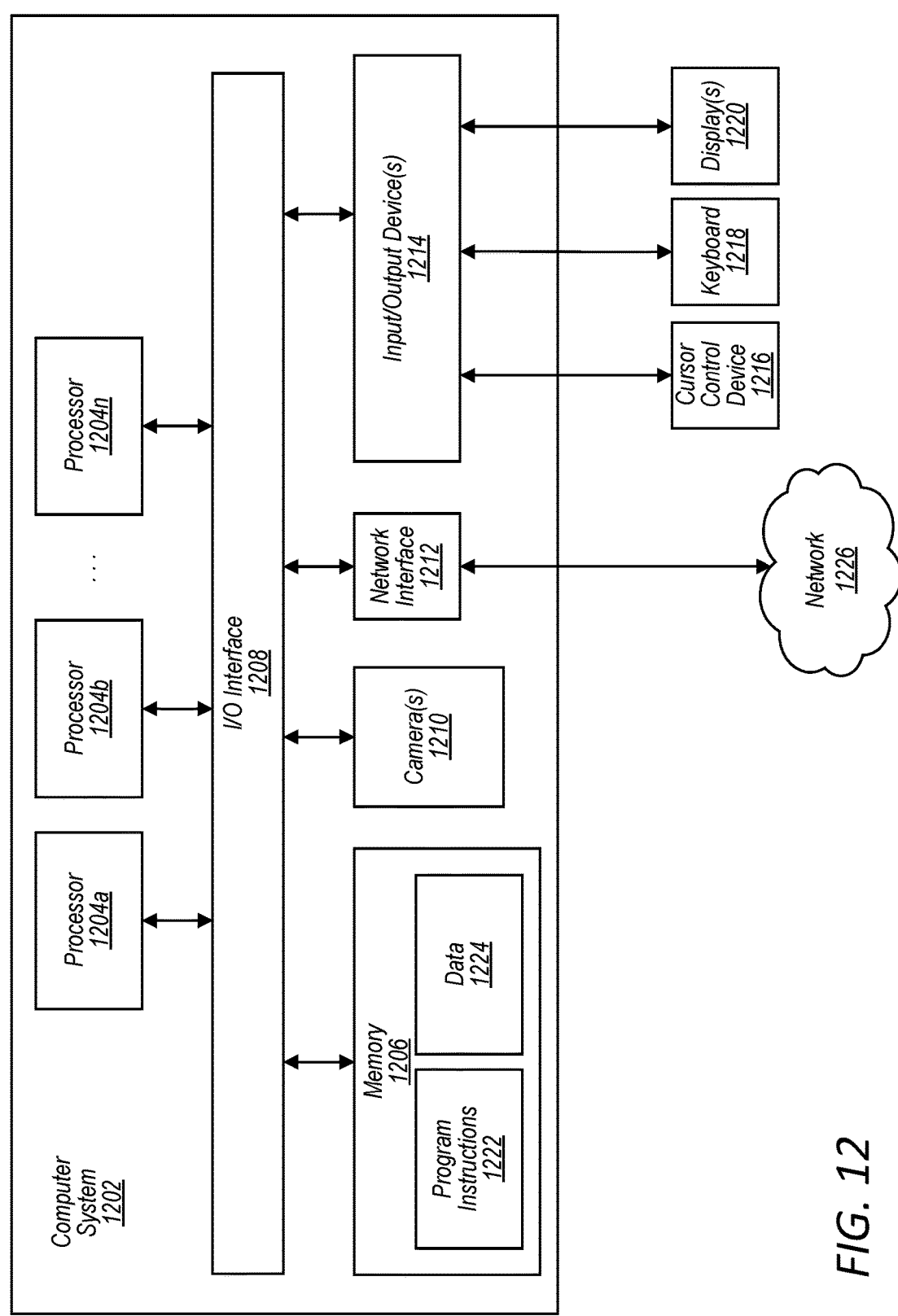
FIG. 12 illustrates a schematic block diagram of an example environment comprising a computer system that may include a multi-camera system with a single flex circuit utilized by multiple cameras, in accordance with some embodiments.

FIG. 12 illustrates a schematic block diagram of an example environment 1200 comprising a computer system 1202 that may include a camera with a flexure-circuit hybrid structure that enables sensor shift actuation, e.g., as described herein with reference to FIGS. 1-11. In addition, computer system 1202 may implement methods for controlling operations of the camera and/or for performing image processing on images captured with the camera. In some embodiments, the device 1102 (described herein with reference to FIG. 11) may additionally, or alternatively, include some or all of the functional components of the described herein.

The computer system 1202 may be configured to execute any or all of the embodiments described above. In different embodiments, computer system 1202 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1202 includes one or more processors 1204 coupled to a system memory 1206 via an input/output (I/O) interface 1208. Computer system 1202 further includes one or more cameras 1210 coupled to the I/O interface 1208. Computer system 1202 further includes a network interface 1212 coupled to I/O interface 1208, and one or more input/output devices 1214, such as cursor control device 1216, keyboard 1218, and display(s) 1220. In some cases, it is contemplated that embodiments may be implemented using a single instance of computer system 1202, while in other embodiments multiple such systems, or multiple nodes making up computer system 1202, may be configured to host different portions or instances of embodiments. For example, in one embodiment some elements may be implemented via one or more nodes of computer system 1202 that are distinct from those nodes implementing other elements.

In various embodiments, computer system 1202 may be a uniprocessor system including one processor 1204, or a multiprocessor system including several processors 1204 (e.g., two, four, eight, or another suitable number). Processors 1204 may be any suitable processor capable of executing instructions. For example, in various embodiments processors 1204 may be general-purpose or embedded processors implementing any of a variety of instruction set architectures (ISAs), such as the x86, PowerPC, SPARC, or MIPS ISAs, or any other suitable ISA. In multiprocessor systems, each of processors 1204 may commonly, but not necessarily, implement the same ISA.

System memory 1206 may be configured to store program instructions 1222 accessible by processor 1204. In various embodiments, system memory 1206 may be implemented using any suitable memory technology, such as static random access memory (SRAM), synchronous dynamic RAM (SDRAM), nonvolatile/Flash-type memory, or any other type of memory. Additionally, existing camera control data 1224 of memory 1206 may include any of the information or data structures described above. In some embodiments, program instructions 1222 and/or data 1224 may be received, sent or stored upon different types of computer-accessible media or on similar media separate from system memory 1206 or computer system 1202. In various embodiments, some or all of the functionality described herein may be implemented via such a computer system 1202.

In one embodiment, I/O interface 1208 may be configured to coordinate I/O traffic between processor 1204, system memory 1206, and any peripheral devices in the device, including network interface 1212 or other peripheral interfaces, such as input/output devices 1214. In some embodiments, I/O interface 1208 may perform any necessary protocol, timing or other data transformations to convert data signals from one component (e.g., system memory 1206) into a format suitable for use by another component (e.g., processor 1204). In some embodiments, I/O interface 1208 may include support for devices attached through various types of peripheral buses, such as a variant of the Peripheral Component Interconnect (PCI) bus standard or the Universal Serial Bus (USB) standard, for example. In some embodiments, the function of I/O interface 1208 may be split into two or more separate components, such as a north bridge and a south bridge, for example. Also, in some embodiments some or all of the functionality of I/O interface 1208, such as an interface to system memory 1206, may be incorporated directly into processors 1204.

Network interface 1212 may be configured to allow data to be exchanged between computer system 1202 and other devices attached to a network 1226 (e.g., carrier or agent devices) or between nodes of computer system 1202. Network 1226 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1212 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 1214 may, in some embodiments, include one or more display terminals, keyboards, keypads, touchpads, scanning devices, voice or optical recognition devices, or any other devices suitable for entering or accessing data by one or more computer systems 1202. Multiple input/output devices 1214 may be present in computer system 1202 or may be distributed on various nodes of computer system 1202. In some embodiments, similar input/output devices may be separate from computer system 1202 and may interact with one or more nodes of computer system 1202 through a wired or wireless connection, such as over network interface 1212.

Those skilled in the art will appreciate that computer system 1202 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1202 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1202 may be transmitted to computer system 1202 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A multi-camera system, comprising:
a first camera;
a second camera actively aligned with the first camera using an active alignment process;
a single flex circuit that is shared by the first camera and the second camera, the single flex circuit comprising:
a first portion coupled with the first camera;
a second portion coupled with the second camera, wherein the second portion comprises a service loop operable to move along multiple axes, proximate the second camera; and
a third portion, comprising a connector for connecting the single flex circuit to one or more other components;
wherein the single flex circuit is configured to convey electrical signals between the connector and each of the first camera and the second camera.

2. The multi-camera system of claim 1, wherein the service loop provides compliance to motion in multiple axes, so as to reduce reaction forces acting on the single flex circuit when positioning the second camera in the active alignment process, relative to reaction forces that would be acting on the single flex circuit during the active alignment process if the single flex circuit did not include the service loop.

3. The multi-camera system of claim 1, wherein the service loop comprises one or more bends.

4. The multi-camera system of claim 1, wherein the service loop is accordion shaped.

5. The multi-camera system of claim 1, further comprising:
a chassis configured to receive multiple cameras;
wherein the first camera and the second camera are mounted in the chassis, and wherein the chassis fixes the position of the first camera relative to the second camera.

6. The multi-camera system of claim 5, wherein at least the third portion of the single flex circuit, that comprises the connector for connecting the single flex circuit to the one or more other components, is located outside of the chassis.

7. A device, comprising:
one or more processors;
memory storing program instructions executable by the one or more processors to control operations of one or more cameras in a multi-camera system; and
the multi-camera system, comprising:
a first camera;
a second camera actively aligned with the first camera using an active alignment process;
a single flex circuit that is shared by the first camera and the second camera, the single flex circuit comprising:
a first portion coupled with the first camera;
a second portion coupled with the second camera, wherein the second portion comprises a service loop operable to move along multiple axes, proximate the second camera; and
a third portion, comprising a connector for connecting the single flex circuit to one or more other components;
wherein the single flex circuit is configured to convey electrical signals between the connector and each of the first camera and the second camera.

8. The device of claim 7, wherein the service loop provides compliance to motion in multiple axes, so as to reduce reaction forces acting on the single flex circuit when positioning the second camera in the active alignment process, relative to reaction forces that would be acting on the single flex circuit during the active alignment process if the single flex circuit did not include the service loop.

9. The device of claim 7, wherein the service loop comprises one or more bends.

10. The device of claim 7, wherein the service loop is accordion shaped.

11. The device of claim 7, wherein:
the multi-camera system further comprises a chassis configured to receive multiple cameras; and
the first camera and the second camera are fixedly mounted to the chassis.

12. The device of claim 11, wherein at least the third portion of the single flex circuit, that comprises the connector for connecting the single flex circuit to the one or more other components, is located outside the chassis.

13. The device of claim 11, wherein the multi-camera system further comprises a third camera fixedly mounted to the chassis, and wherein the single flex circuit is shared by the first camera, the second camera, and the third camera.

14. A method of constructing a multi-camera system, the method comprising:

coupling a single flex circuit with a first camera and a second camera of the multi-camera system, wherein the coupling comprises:

attaching a first portion of the single flex circuit to the first camera; and attaching a second portion of the single flex circuit to the second camera, wherein the second portion comprises a service loop operable to move along multiple axes, proximate the second camera;

wherein a third portion of the single flex circuit comprises a connector for connecting the single flex circuit to one or more other components; and wherein the single flex circuit is configured to convey electrical signals between the connector and each of the first camera and the second camera.

15. The method of claim 14, further comprising:

coupling the first camera to a chassis; and coupling, after the first camera is coupled to the chassis, the second camera to the chassis, wherein the coupling the second camera to the chassis comprises:

actively aligning, using an active alignment process, the second camera with the first camera; and fixedly attaching the second camera to the chassis after the second camera is actively aligned with the first camera.

16. The method of claim 15, wherein the service loop provides compliance to motion in multiple axes, so as to reduce reaction forces acting on the single flex circuit when positioning the second camera in the active alignment process, relative to reaction forces that would be acting on the single flex circuit during the active alignment process if the single flex circuit did not include the service loop.

17. The method of claim 16, wherein the service loop comprises one or more bends.

18. The method of claim 16, wherein the service loop is accordion shaped.

19. The method of claim 14, further comprising:

bending the second portion of the single flex circuit to form the service loop, wherein, based on the bending, the service loop comprises multiple bends in an accordion arrangement.

20. The method of claim 14, further comprising:

attaching a fourth portion of the single flex circuit to a third camera of the multi-camera system actively aligning, using an active alignment process, the third camera with at least one of the first camera or the second camera; and fixedly attaching the third camera to the chassis after the third camera is actively aligned with the at least one of the first camera or the second camera.

\* \* \* \* \*